US010375894B2

(12) United States Patent
Bonte et al.

(10) Patent No.: US 10,375,894 B2
(45) Date of Patent: Aug. 13, 2019

(54) AGRICULTURAL BALER WITH IMPROVED FLYWHEEL BRAKE

(71) Applicant: CNH Industrial America LLC, New Holland, PA (US)

(72) Inventors: Xavier G. J. M. Bonte, Et Sint Kruis (NL); Stefan De Rycke, Olsene-Zulte (BE); Frederik Demon, Bruges (BE); Pieter Vandevelde, Sint Michiels Brugge (BE)

(73) Assignee: CNH Industrial America LLC, New Holland, PA (US)

(*) Notice: Subject to any disclaimer, the term of this patent is extended or adjusted under 35 U.S.C. 154(b) by 919 days.

(21) Appl. No.: 14/768,894

(22) PCT Filed: Feb. 18, 2014

(86) PCT No.: PCT/EP2014/053068
§ 371 (c)(1),
(2) Date: Aug. 19, 2015

(87) PCT Pub. No.: WO2014/128098
PCT Pub. Date: Aug. 28, 2014

(65) Prior Publication Data

US 2016/0000016 A1 Jan. 7, 2016

(30) Foreign Application Priority Data

Feb. 21, 2013 (BE) .................................. 2013/0118

(51) Int. Cl.
*A01F 15/08* (2006.01)
*A01F 21/00* (2006.01)
*F16D 51/00* (2006.01)
*F16D 55/225* (2006.01)

(52) U.S. Cl.
CPC .......... *A01F 21/00* (2013.01); *A01F 15/0841* (2013.01); *F16D 51/00* (2013.01); *F16D 55/225* (2013.01)

(58) Field of Classification Search
CPC ...... A01F 15/0841; A01F 21/00; F16D 51/00; F16D 55/225
See application file for complete search history.

(56) References Cited

U.S. PATENT DOCUMENTS 1,401,715 A 12/1921 McCordquodale
3,563,114 A * 2/1971 Casale .................... F16D 13/52 192/18 R
4,286,696 A * 9/1981 Szymski ................ F16F 15/30 188/218 A (Continued)

FOREIGN PATENT DOCUMENTS

WO WO 2011018456 A1 * 2/2011 ......... A01F 15/0841

*Primary Examiner* — Gregory D Swiatocha
(74) *Attorney, Agent, or Firm* — Patrick M. Sheldrake; Peter K. Zacharias

(57) ABSTRACT

An agricultural baler has a shaft, and a flywheel connected to the shaft, and a brake system for holding or for stopping the flywheel. The brake system may be of at least one of the drum-type and of the caliper-type. The caliper-type has a brake disc and a brake caliper. The brake disc may be mounted on the flywheel, or on the shaft. The brake system may have an adjustable braking force. The disc brake may be manually or hydraulically activated. The brake system may be remotely activated from a tractor.

19 Claims, 7 Drawing Sheets

(56) References Cited

U.S. PATENT DOCUMENTS

| | | | | | |
|---|---|---|---|---|---|
| 6,361,123 | B1 * | 3/2002 | Hamilton | B60T 7/12 | 180/197 |
| 7,464,526 | B2 * | 12/2008 | Coenen | A01B 61/025 | 192/56.1 |
| 2003/0069102 | A1 | 4/2003 | Coenen | | |
| 2003/0167939 | A1 * | 9/2003 | Roth | A01F 15/0841 | 100/342 |
| 2005/0103131 | A1 | 5/2005 | Barnett et al. | | |
| 2007/0008089 | A1 * | 1/2007 | Ichimi | G09B 9/058 | 340/432 |
| 2010/0108413 | A1 * | 5/2010 | Lang | A01F 15/0841 | 180/53.1 |
| 2012/0204742 | A1 * | 8/2012 | Van Vooren | A01F 15/0841 | 100/349 |

* cited by examiner

AGRICULTURAL BALER WITH IMPROVED FLYWHEEL BRAKE

This application is the US National Stage filing of International Application Serial No. PCT/EP2014/0053068 filed on Feb. 18, 2014 which claims priority to Belgian Application BE2013/0118 filed Feb. 21, 2013, each of which is incorporated herein by reference in its entirety.

FIELD OF THE INVENTION

The invention relates to the field of agricultural balers for producing bales of compressed agricultural crop material. More specifically, the present invention relates to large balers with a heavy flywheel (e.g. 700 kg).

BACKGROUND OF THE INVENTION

The vast majority of balers do not have their own engine, but are towed by a tractor, and is are powered by coupling the power take-off (PTO) shaft of the tractor to an input shaft of the baler. The balers further have a flywheel connected to the input shaft, and a gearbox that drives the various mechanisms in the baler to pick-up the crop from a field, to form the crop into bales and to wrap twine and/or foil around the bales.

A one-way clutch is typically arranged between the PTO shaft and the flywheel to allow the flywheel to rotate faster than the PTO shaft. The baler input shaft can be operatively decoupled from the tractor PTO, e.g. for transportation of the baler from one field to the other.

A large and heavy flywheel is typically required in a baler, especially in so called "large square balers", or "high density balers" to overcome peak loads encountered by the baler gearbox, which occurs e.g. when the plunger of the baler compresses the crop material in the bale chamber when forming the bales. By using a flywheel with a high inertia and running at a high speed (e.g. 1000 rpm), peak energy for the peak loads can be delivered by the flywheel, which slightly slows down during each compression, and which is accelerated again by the tractor PTO between two compressions.

When all the crop material of one field is processed, the baler is shut down for safety reasons before being transported to another field. When the baler (i.e. the flywheel and the various mechanisms connected thereto) has come to a stop, it is known in the art to keep the flywheel (and the various mechanisms along with it) in a fixed position by using a belt which is tensioned around a section of the flywheel.

It is important to keep the flywheel in a fixed position during transport, because objects or people wearing loose clothing that may come too close to the baler might get caught in the moving parts. This is especially important with heavy flywheels (e.g. 700 kg) and heavy crank arms (e.g. 150 kg), which may cause the flywheel to turn under their weight, or due to acceleration or deceleration of the tractor, or inclination of the road.

It may be even more important to keep the flywheel in a fixed position when an operator is working on the baler, e.g. during maintenance or repair.

As the flywheel becomes larger and heavier, the belt and fastener do not guarantee sufficient safety anymore. Moreover, improper handling of the belt can cause dangerous situations.

SUMMARY OF THE INVENTION

It is an object of embodiments of the present invention to provide a baler with a higher degree of safety.

In particular, it is an object of embodiments of the present invention to provide a baler with a safe mechanism for holding the flywheel in a fixed position during transport.

In a first aspect, the present invention provides an agricultural baler, comprising a shaft for coupling with a power take-off; a flywheel connected to the shaft; and a brake system comprising a disc brake system and/or a drum brake system adapted for braking the flywheel.

Whereas a belt was useful for holding small flywheels in position, this is not the case anymore for heavy flywheels, having weight of e.g. 700 kg. By adding a brake system comprising a disc brake and/or a drum brake to the baler, a baler with a highly reliable and safe brake system is provided, not only for holding the flywheel in a fixed position, but also for slowing down the flywheel when the baler is switched off. Even when the brake is operated manually, the flywheel can be controlled accurately and securely.

Disc brake systems and drum brake systems are mature components with a well-known reliability, and manageable wear issues. By adding a disc brake system or a drum brake system to the baler flywheel, the safety of the baler is largely increased, not only during transportation or while being parked, but also during maintenance or repair, as the risk that the flywheel would suddenly move because of shocks or vibrations is reduced or suppressed.

A huge advantage of the disc brake system or drum brake system is that it not only guarantees a fixed maintained position of the flywheel, but in addition, can also be used for slowing down a moving flywheel. This was simply not possible with the belt. By offering the ability to actively slow down the baler, instead of having to wait until the baler has come to a full stop by itself, time (e.g. on the field) can be more efficiently used. Alternatively, the safety of the baler operators is increased, especially for those cases where the baler was already torn away before it had come to a complete stop, or late at night, after a hard day of work.

Furthermore, the disc brake system or drum brake system is especially useful in emergency situations, because it allows the flywheel, and the various baler mechanisms, to be stopped much faster than was possible in the past, and moreover, in a safe and reliable way, without damaging the machine, or parts thereof.

An advantage of a disc brake system is that the force exerted by the brake is adjustable. Thus, if desired, a relatively low force can be applied for moderately braking the flywheel, at moderate wear during daily work. But in cases of emergency, the flywheel can be stopped at maximum force, in a minimum amount of time. It is clear that in such cases having a disc brake on the flywheel or not can make the difference between life and death.

In embodiments of the agricultural baler the brake system comprises a drum brake system.

In embodiments of the present invention, the brake system can be a drum brake system. In another embodiment, the brake system can be a disc brake system comprising a drum brake system (e.g. for hand brake purpose). A particular advantage of drum brake systems is that they are less expensive to manufacture than disc brake systems, and they easily incorporate an emergency mechanism, which can be actuated by a different power source than the primary braking system, e.g. by a cable actuation mechanism. The cable may e.g. be connected to a handbrake lever.

In embodiments of the agricultural baler, the disc brake system is a caliper-type disc brake system, comprising a brake disc and a brake caliper.

A particular advantage of a disc brake system and in particular of a caliper-type disc brake system is that it contains less parts than a drum brake system, and is easier to maintain. Other advantages are that the braking force is adjustable and proportional to the pressure placed on the brake pads, and that a disc brake system such as a caliper-type disc brake system cannot block because of lack of self-assist.

In embodiments of the agricultural baler, the brake disc is mounted on the flywheel.

This has the advantage that the braking forces and braking heat can be directly transferred to the flywheel, and stress exerted on the shaft can be reduced.

In embodiments of the agricultural baler, the centre of mass of the brake disc coincides with the centre of mass of the flywheel.

In this way, the flywheel and brake disc are better balanced, which further reduces stresses and wear of the shaft.

An agricultural baler according to embodiments of the present invention may further comprise a gearbox, and the brake caliper may be mounted to the gearbox.

This offers the advantage that the forces acting upon the brake caliper are transferred to the gearbox, which is a rigid and high strength part of the baler, well capable of withstanding these forces, without breaking off, thus enhancing the safety. In addition, vibrations, wear and tolerances can be kept well under control.

An agricultural baler according to embodiments of the present invention may further comprise a handle connected to the brake system via a cable.

The handle may be a handbrake lever for manually stopping the flywheel, or for fixing the position of the flywheel. In an embodiment, the handle has a toothed segment for blocking its position in one of several alternative positions, and a push-button for releasing it from this blocked position. This may be particularly useful as an emergency brake, since it can be operated manually.

In embodiments of the agricultural baler, the brake system comprises a hydraulic brake system, and the baler further comprises a hydraulic circuit fluidly connected to the brake system, and further comprises a brake controller for activating and deactivating the brake system.

In this embodiment, very large forces can be exerted on the brake system, resulting in a very large braking force for the flywheel, which is decelerated much faster, while only minimal effort is required for operating it (a child can operate it). This further improves the safety. Moreover, it allows the activation to be done remotely, e.g. from the tractor, which further increases the safety, because time can be gained by not having to leave the tractor, time which may not be available in case of emergency. Furthermore, the brake controller may communicate with a tractor controller, and may e.g. prohibit baler startup as long as the flywheel brake is active.

An agricultural baler according to embodiments of the present invention may further comprise an emergency stop input device connected to the brake controller, and the brake controller may be adapted for activating the brake system with at least a predetermined braking force.

When receiving a 'brake'-command from the emergency stop input device, the controller would apply the maximum allowable braking force, so as to bring the flywheel and the various baler functions to a stop as soon as possible.

In embodiments thereof, the agricultural baler further comprises a sensor connected to the brake controller, and is further adapted for detecting if a door of the baler is opened, and for sending a signal to the brake controller for stopping the flywheel when the door is opened.

In this way the flywheel is automatically stopped when a door or a panel of the baler is opened. This again enhances the safety.

In a second aspect, the present invention provides a baler flywheel assembly, comprising a flywheel and a brake system mounted on the baler flywheel, the brake system comprising a disc brake system and/or a drum brake system.

This flywheel assembly is an integrated part of one of the embodiments of the baler according to the invention.

In embodiments of the baler flywheel assembly, the centre of mass of the brake disc substantially coincides with the centre of mass of the flywheel.

In a third aspect, the present invention provides a baler gearbox assembly, comprising a baler gearbox and a baler flywheel assembly according to the second aspect, mounted to the baler gearbox, wherein the brake system is a caliper-type disc brake system comprising a brake disc and a brake caliper, the brake caliper being mounted to the baler gearbox for engaging with the brake disc of the baler flywheel assembly.

This gearbox assembly is a further integrated part of a baler according to embodiments of the invention.

In a fourth aspect, the present invention provides a tractor and baler combination, comprising an agricultural baler according to the first aspect; a tractor having a PTO connectable to the shaft of the baler for accelerating the flywheel of the baler and wherein the tractor further comprises a tractor controller circuit for sending a command to the brake controller for activating the brake system.

This allows commands for stopping the flywheel to be sent by the tractor driver remotely, without having to step towards the baler. This is faster, safer, and more convenient. Such brake controller may also incorporate additional functionality such as checking if the brake is deactivated before allowing the PTO shaft to be coupled.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

The invention will be further elucidated by means of the following figures.

Figure 1:
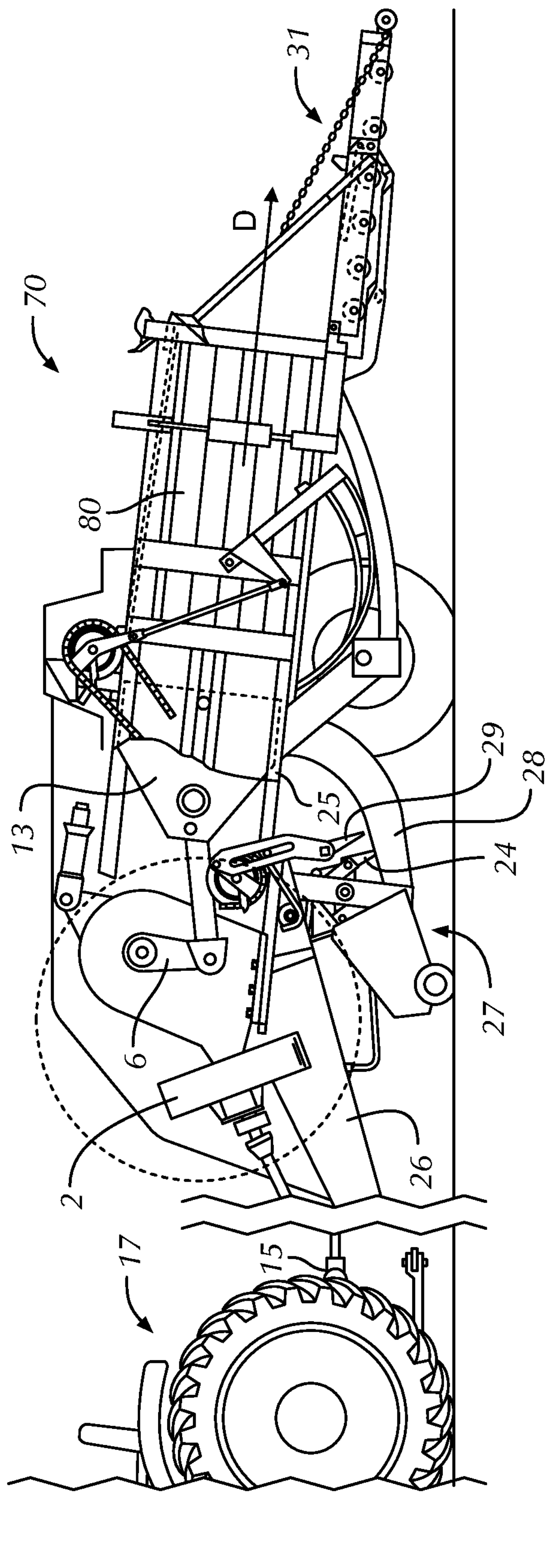
FIG. 1 is an side view of (part of) a classical tractor and a towable baler.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to "rectangular baler" reference is made to an agricultural baler for making cuboid bales.

Where in embodiments of the present invention reference is made to "high density bales", bales with a density higher than 100 kg/m$^3$, for example higher than 190 kg/m$^3$ are meant.

In the present invention, "centre of gravity" and "centre of mass" are used as synonyms.

Where in embodiments of the present invention reference is made to a "brake system", reference is made to a device for slowing or stopping the rotation of a wheel while it is in motion. In this application reference is made to disc brake systems (such as the caliper-type of disc brake systems), as well as drum brake systems. The caliper-type of disc brake comprises a brake disc and a caliper, the brake caliper comprising two brake pads to be forced to the sides of the disc.

Agricultural balers, of the type that can be towed and powered via a tractor PTO are known in the art. Referring to the drawings, FIG. 1 shows an example of an agricultural baler 70 comprising a frame 25 which is equipped with a forwardly extending tongue 26 at its front end with hitch means (not shown) for coupling the baler 70 to a towing tractor 17. A power take-off 15 extends rearward from the towing tractor 17. A pick-up assembly 27 lifts windrowed crop material off the field as the baler 70 is travelled thereover, e.g. while being pulled by a tractor, and delivers such material into the front end of a rearwardly and upwardly curved, charge-forming feeder duct 28. The duct 28 communicates at its upper end with an overhead, fore-and-aft extending bale chamber 80 into which crop charges are loaded by a cyclically operating stuffer mechanism 29. A continuously operating packer mechanism 24 at the lower front end of the feeder duct 28 continuously feeds and packs material into the duct 28 so as to cause charges of the crop material to take on and assume the internal configuration of the duct 28 prior to periodic engagement by the stuffer mechanism 29 and insertion up into the bale chamber 80. The packer mechanism 24 may be replaced by a rotor mechanism which will also continuously feed and pack material into the duct 28. The feeder duct 28 may be equipped with means (not illustrated) for establishing whether a complete charge has been formed therein and operating the stuffer mechanism 29 in response thereto. Each action of the stuffer mechanism 29 introduces a "charge" or "flake" of crop material from the duct 28 into the chamber 80.

A plunger 13 reciprocates in a fore-and-aft direction within the bale chamber 80, at least within a first part thereof. Biomass fed via the feeder duct 28 is thereby compacted, e.g. compressed or otherwise treated, so as to form bales in the above-described operation of the agricultural baler 70. Cuboid shaped bales, also known as "rectangular bales" are formed. The formed bales may then be moved forward by the reciprocating motion of the plunger 13 to shift serially and incrementally along the bale chamber 80 towards a discharge outlet, wherefrom the bales may eventually be ejected. The baler 70 may furthermore comprise components such as a knotter mechanism for automatically tying the completed bales with e.g. twine or similar lineal object to make them self-supporting, for example for shipping and storage. Once tied, the bales are discharged from the discharge outlet of the bale chamber 80 onto a discharge 31 in the form of a chute, generally designated 31, for gently lowering the bales near ground level.

Large balers 70, especially rectangular balers 70 for producing high-density bales have a flywheel 2 with a relatively large diameter (e.g. in the range of 75 to 130 cm, e.g. 110 cm) and heavy weight (e.g. in the range of 300 to 1000 kg, e.g. 700 kg) for obtaining a high inertial mass or energy equivalent. When all crop material of one field is compacted into bales, the baler 70 is temporarily stopped, e.g. by decoupling or disabling the tractor PTO. While running freely, the flywheel 2 will slow down until it stops, and the related functions, such as the pick-up, packer or stuffer mechanism are deactivated along with the flywheel 2. When the baler 70 is stopped, e.g. temporarily on the field before being transported to another field, or e.g. permanently when parked in a barn, or e.g. for maintenance in a garage, it is important that the flywheel 2 cannot accidentally rotate, e.g. under the weight of the crank 6, or e.g. due to shocks or vibrations.

It is known in the art to block the flywheel by means of a belt, e.g. made from leather, but the use of such a belt has several disadvantages, e.g. the belt is subject to wear, and cannot and should not be tensioned while the flywheel 2 is still moving. A more reliable mechanism for holding the flywheel 2 is therefore desired.

While looking for a more reliable mechanism for holding a flywheel 2 (especially a large and heavy flywheel 2), the inventors came up with the idea of adding a brake system 40 comprising a disc brake system 40 and/or a drum brake system 40 to the flywheel 2. As far as known to the inventors, no agricultural balers 70 with such a brake system for keeping the flywheel 2 in a fixed position, exist yet. Balers 70 may have other brakes, such as brakes for stopping a wrapping roll, or brakes for stopping the conveyer, but these brakes are required for its normal operation. A brake system 40 (according to embodiments of the invention) mounted to the flywheel 2 is not required for its normal operation. On the contrary, whereas disc brake systems 40 and drum brake systems 40 are known and very much used for stopping moving vehicles, such as automobiles and trains, they are not used in the field of agricultural balers 70 for stopping the flywheel 2. There is a general acceptance in the field of agricultural balers 70 that balers 70 have a flywheel 2 with a large inertia, which needs a significant time to come to a complete stop. Everyone also knows and it is generally accepted that it may be dangerous to approach a baler 70 before it has come to a full stop.

By providing a brake system 40, not only the problem of holding a large and heavy flywheel 2 in a fixed position is solved, but in addition, the brake system 40 adds the ability to actively slow down the flywheel 2 when the baler 70 is switched off. This has the advantage that the switch-off of the baler 70 may be considerably faster and the use of the baler 70 may be considerably safer.

Figure 2:
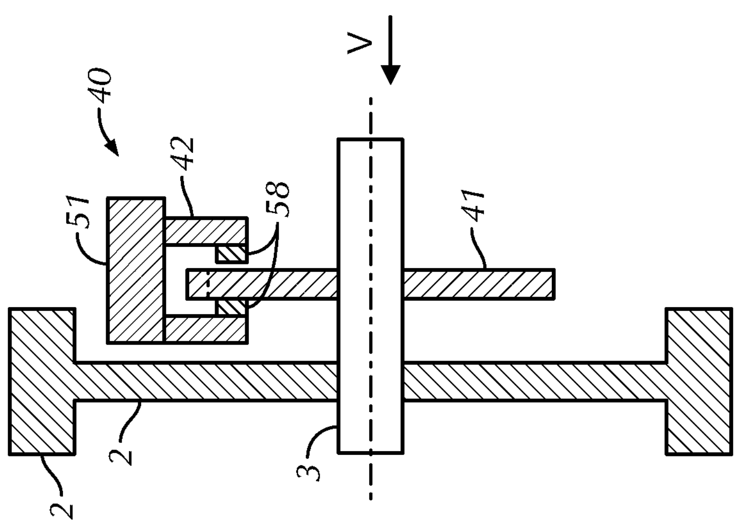
FIG. 2 is a schematic drawing of a flywheel and disc brake arrangement according to an embodiment of the present invention.

Such a baler flywheel arrangement is schematically illustrated in FIG. 2. For example, the flywheel 2 may have a three-dimensional shape with an outer diameter "D" in the range of 75 to 130 cm, e.g. 110 cm, and a maximum thickness of 40 to 60 cm, e.g. 50 cm, and a weight in the range of 300 to 1000 kg, e.g. 700 kg, whereas the brake disc 41 may have a substantially planar shape, with a diameter "d" in the range of 30 to 60 cm, e.g. 45 cm, and a thickness of 25 to 35 mm, e.g. 30 mm, and a weight in the range of 20 to 40 kg, e.g. 30 kg. Such a disc 41 is quite easy to produce, e.g. starting from casted iron, machining its side surface. It can also be easily mounted on the shaft 3, or to a flywheel 2, if the flywheel 2 has provisions for mounting the brake disc 41. Note that the diameter "d" of the brake disc 41 can be selected independent of the diameter "D" of the flywheel 2, so that the dimensions of the flywheel 2 and disc 41 may be optimized for different purposes, in particular the diameter "d" of the brake disc 41 can be optimized for the desired braking speed, and for heat transfer.

It is noted that FIG. 2 to FIG. 6 are only schematic drawings, they are not drawn to scale, but only show the principles of the invention. For example, the flywheel 2 and the parts of the disc brake system 40 as shown have a very simple shape for illustrative purposes, so as not to obscure their relation with the other elements shown in the figure. FIG. 7 to FIG. 12 show a real example, by means of 3D CAD drawings, and are drawn to scale.

Several embodiments are described next. In FIG. 2 the brake disc 41 is mounted on the shaft 3, and is thus mounted to the flywheel 2 indirectly, whereas in the embodiments of FIG. 4 and FIG. 5, the brake disc 41 is mounted to the flywheel 2 directly. The brake disc 41 may be connected to the flywheel 2 by fastening means, such as e.g. screws (not shown).

Figure 3:
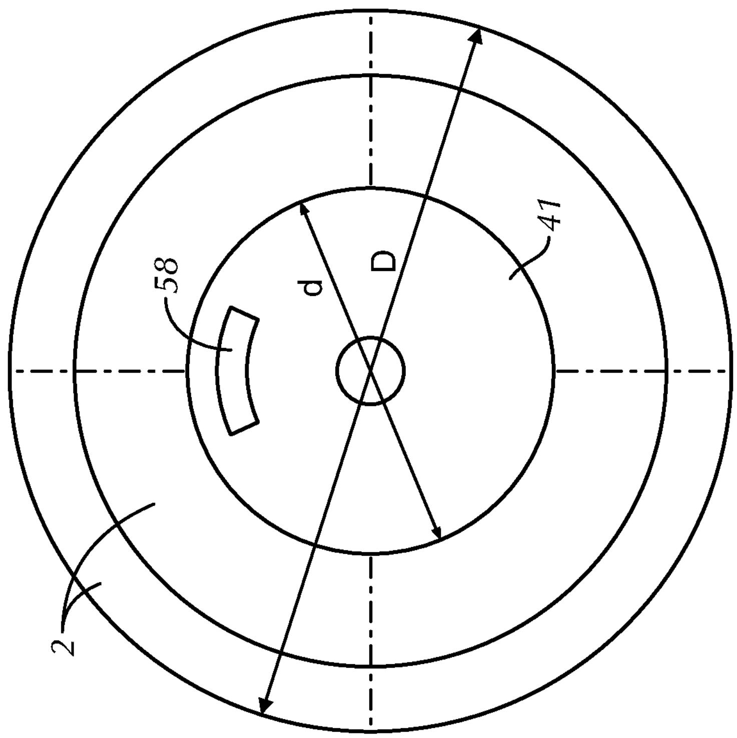
FIG. 3 is a front view (direction V) of the schematic drawing of FIG. 2, further showing the position of a brake pad.

FIG. 3 is a view from angle V of FIG. 2. The brake disc 41 is preferably made of steel or cast iron. The brake disc 41 may have holes drilled through them (not shown), for heat dissipation purposes. The brake caliper 51 may be a floating caliper (having a single piston), but is preferably a fixed caliper, for avoiding sticking failures. In embodiments of the present invention, the disc brake system 40 comprises the brake disc 41 described above, and a brake caliper 51, having a pair of brake claws 42, each having a brake pad 58 made of a high friction material for contacting the side surface of the brake disc 41 when the disc brake 40 is activated. Although the disc brake system 40 shown in FIG. 2 and FIG. 3 is a disc brake system 40 (actually a caliper-type disc brake system 40), the invention will also work with a drum brake system 40. Both types of brake systems are well known in the field of automobiles and railway, and therefore need not be described in further detail here. The brake system 40 may be activated in any known way, e.g. mechanically, hydraulically, pneumatically or electromagnetically. In an embodiment the brake system 40 is activated manually by means of a handbrake lever, pivotally mounted for creating a leverage effect. The lever may have a toothed section, for maintaining the position of the handle in a predefined position. The handle may also have a knob for disengaging the toothed section, for releasing the brake system 40. Such brake systems and handles are well known in the automobile industry, and have proven their reliability. In an embodiment of the present invention, the brake system 40 may comprise both, a disc brake system (e.g. hydraulically activated) and a drum brake system (e.g. a mechanical drum brake system manually activated via a handbrake lever as described above).

Caliper-type disc brakes 40 have the advantage (e.g. over drum brake systems (40)) that the braking can be better controlled, because the braking force is proportional to the pressure placed on the brake pad 58 by the braking system 40, e.g. via any brake servo, braking pedal or lever, and a caliper-type disc brake system 40 cannot block because of lack of self-assist. Drum brake systems (40) may be cheaper.

Figure 4:
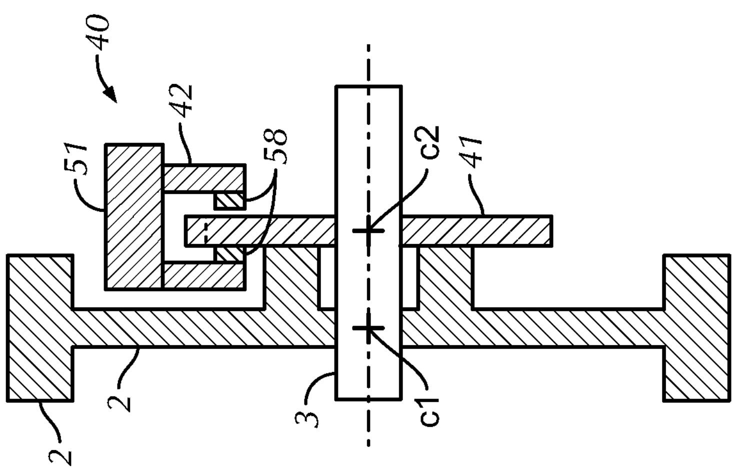
FIG. 4 is a schematic drawing in side view of another flywheel and disc brake arrangement according to an embodiment of the present invention, the brake disc being directly mounted on the flywheel.

FIG. 4 shows a variant of the flywheel arrangement of FIG. 2, wherein the brake disc 41 is connected directly to the flywheel 2, e.g. by means of screws (not shown). An advantage of mounting the brake disc 41 directly to the flywheel 2 is that the forces applied to the brake disc 41 during deceleration of the flywheel 2 (i.e. when braking) are directly transferred from the disc 41 to the flywheel 2, instead of via the shaft 3. This prevents a large torque to be applied over the shaft portion between the flywheel 2 and the brake disc 41. Another advantage is that heat transfer is increased, thanks to the larger contact area with the flywheel 2, closer to the braking surface.

Figure 5:
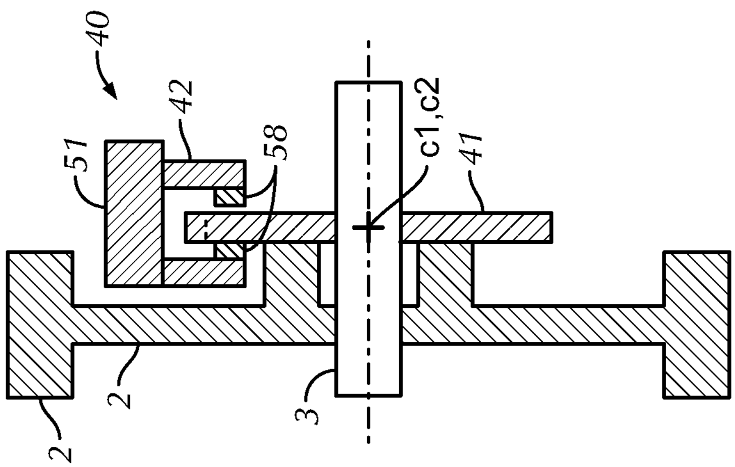
FIG. 5 is a schematic drawing of an embodiment of a flywheel and brake disc assembly shaped and arranged for having coinciding centers of mass.

FIG. 5 shows another variant of the flywheel arrangement of FIG. 4, wherein the flywheel 2 is shaped such that the centre of mass c1 of the flywheel 2, and the centre of mass c2 of the brake disc 41 coincide. The main advantage hereof is that during acceleration or deceleration of the flywheel 2 by means of the disc brake 41, the forces exerted upon the shaft 3 are largely reduced. This also reduces stresses exerted upon other components connected to the shaft 3, such as e.g. the shaft bearings (not shown).

Figure 6:
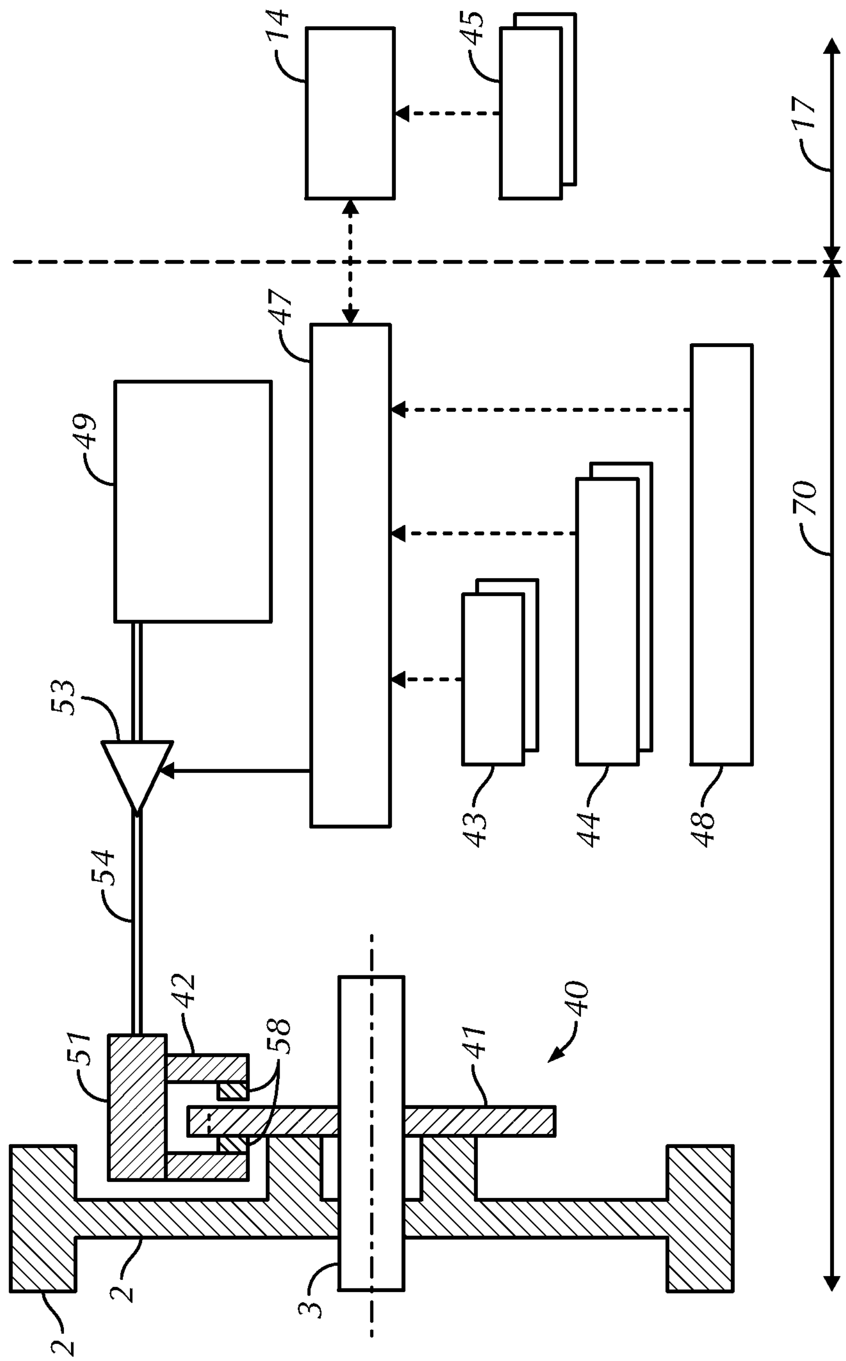
FIG. 6 is a schematic drawing of a system according to an embodiment of the present invention comprising a tractor (right) and a baler (left), the baler comprising the flywheel and disc brake arrangement of FIG. 4.

FIG. 6 is a schematic drawing of an example of a system comprising a tractor 17 (right) and a baler 70 (left), the baler 70 comprising any of the flywheel arrangements described above. In fact, the system embodiment of FIG. 6 combines several technical features, which may also be implemented separately, or combined differently.

Common to all embodiments is the brake disc 41 having a smooth, e.g. machined side portion adapted for contacting brake pads 58. The brake caliper 51 is preferably mounted to the gearbox 46 (see FIG. 12), which is a rigid part, located close to the flywheel 2, but other suitable parts of the baler frame 25 may also be used for mounting the brake caliper 51. Mounting the brake caliper 51 to the gearbox 46, which is a rigid part, offers the advantage that tolerances can be better controlled, and stresses and vibrations can be limited.

The brake caliper 51 of FIG. 6 is a hydraulic caliper fluidly coupled to the hydraulic system 49 of the baler 70 via hydraulic lines 54 and a control valve 53. The brake caliper 51, may comprise two or more pistons, also called 'pots'. The control valve 53 is controlled via a brake controller 47 which may be part of an integrated baler controller (not shown). The brake controller 47 may e.g. be or comprise an electronic controller adapted for activating or deactivating the brake caliper 51 with a predetermined braking force, depending on the input devices 43, 44, 48, 45 giving a brake command. In an embodiment, the baler 70 has a sensor 43 for detecting if a door or panel (not shown) is opened, and for sending a signal to the brake controller 47 for activating the disc brake 40 for stopping and/or holding the flywheel 2. In the same, a further or another embodiment, the brake controller 47 may be connected to a tractor controller 14, which may send a command from a tractor input device 45, e.g. a handle or a button, for activating the flywheel disc brake 40. In the same, a further or another embodiment, the baler 70 may have an local input device 44, e.g. a handle, a button, a pedal or another input device, connected to the brake controller 47, for activating the disc brake 40. In the same, a further or another embodiment, the baler 70 may have an emergency stop input device 48, e.g. an emergency button or emergency foot pedal connected to the brake controller 47, e.g. for activating the disc brake 40 in such a way that the flywheel 2 is stopped as soon as possible (e.g. by applying the maximum possible braking force).

Figure 8:
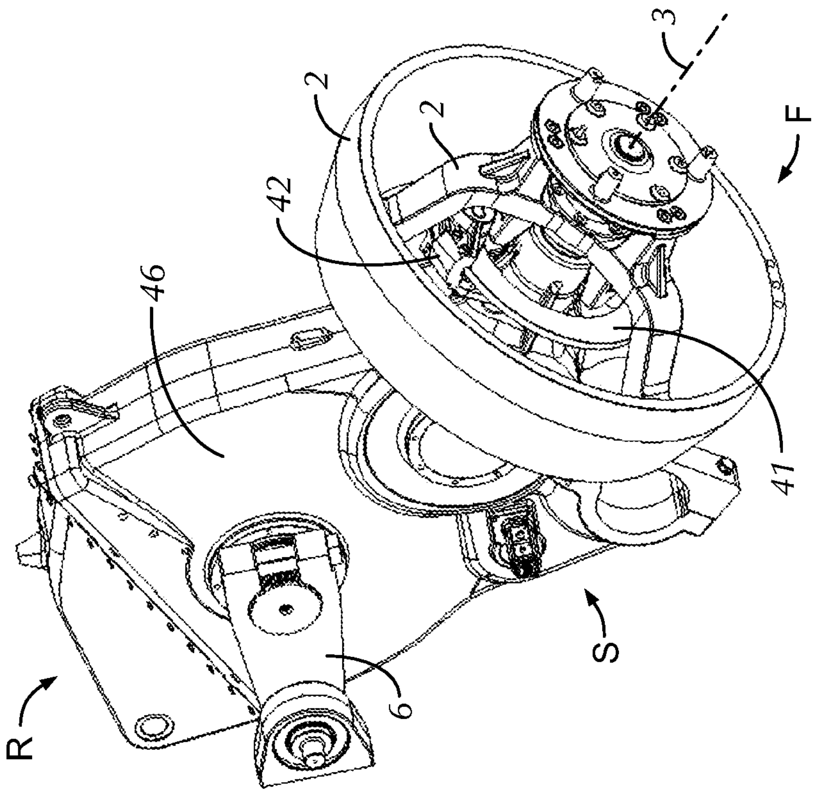
FIG. 7 and FIG. 8 are isometric views of an embodiment of a gearbox assembly comprising a gearbox and a flywheel mounted on an input shaft of the gearbox, and a brake disc mounted to the flywheel, and a brake caliper mounted to the gearbox.
Figure 7:
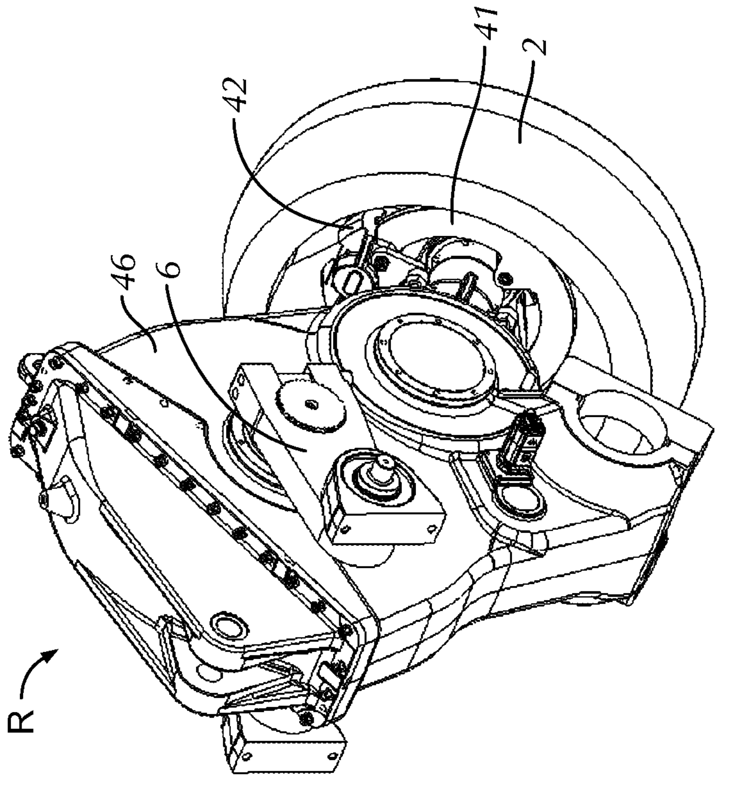

FIG. 7 and FIG. 8 show 3D CAD drawings of a gearbox 46 with a shaft 3 and a flywheel 2 mounted on the shaft 3. The flywheel 2 has a combined shape consisting of a conical outer part with a high inertia, and three supporting ribs for connecting the conical outer part to the shaft 3. A brake disc 41 of the disc brake 40 is connected to the flywheel 2 by means of screws. The centre of mass of the brake disc 41 coincides with the centre of mass of the flywheel 2. The brake caliper 51 is connected to the gearbox 46. This offers the advantage that the forces acting upon the brake caliper 51 are transferred to the gearbox 46, which is a rigid and high strength part of the baler 70, well capable of withstanding these forces, without breaking.

Instead of providing a single caliper 51, it is also possible to provide multiple, e.g. two or three or more brake calipers 51. This has the advantage that the total braking force exerted upon the flywheel 2 can be increased, and consequently that the time needed to stop the flywheel can be decreased. By distributing the brake calipers 51 at 180° (in case of two calipers), or at 120° angular distance (in case of three calipers), etc, the forces exerted upon the shaft 3 during braking may also be reduced, because the friction forces exerted upon the brake disc 41 would be approximately equal in size, but having different directions, thus forming no net force, but a moment. Another advantage would of course be that in case of failure or malfunction of one of the brake calipers, the others would still function, thus increasing the safety of the baler.

Figure 10:
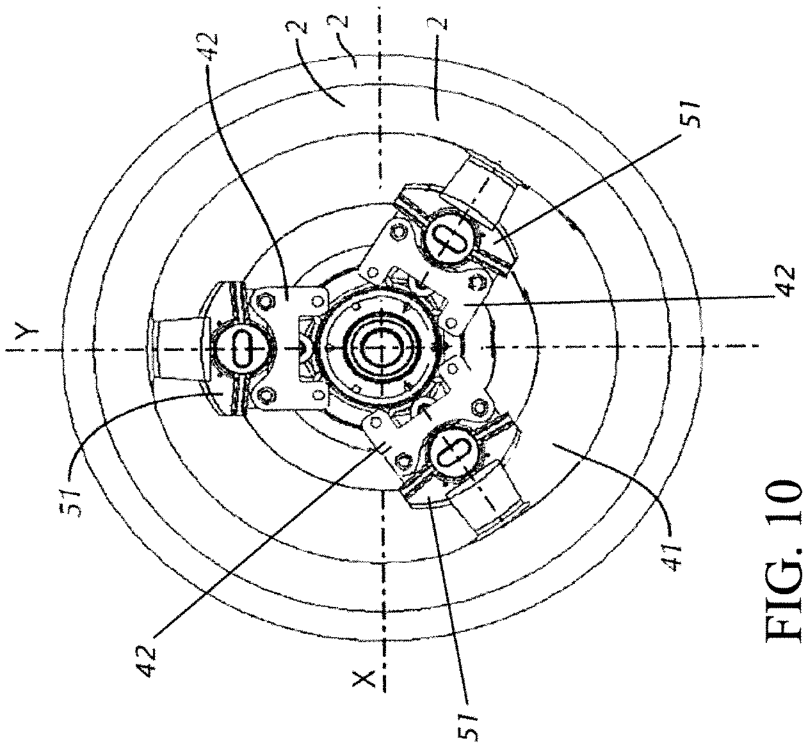
FIG. 10 is a rear view of the flywheel assembly of FIG. 9, additionally showing a brake caliper.
Figure 9:
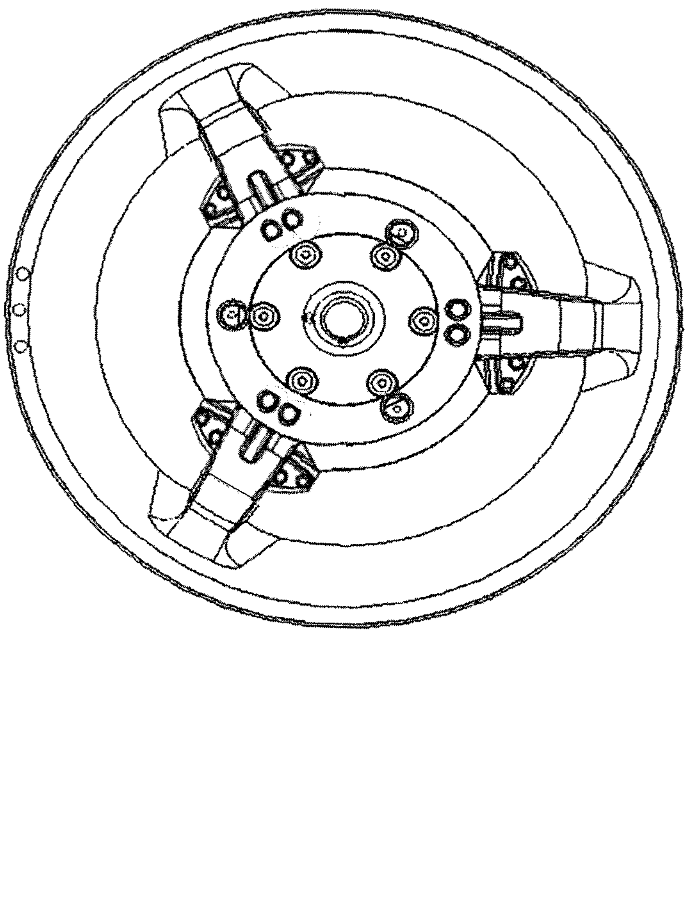
FIG. 9 is a front view of a flywheel assembly comprising the flywheel and the brake disc shown in FIG. 7 and FIG. 8 according to an embodiment of the present invention.

FIG. 9 and FIG. 10 show the flywheel 2 and disc brake assembly of FIG. 7 and FIG. 8 respectively in front view F and in rear view (viewing angle F and R in FIG. 7 and FIG. 8). In FIG. 9, the flywheel ribs are visible and hiding a large part of the brake disc 41. In FIG. 10, the brake disc 41 is hiding a large part of the flywheel ribs.

In the examples shown in FIG. 7 to FIG. 10, the (single) brake caliper 51 is positioned substantially "vertically above" the shaft 3, (on the Y-axis of FIG. 10), but other positions are also possible. In fact, for the shape of the baler gearbox 46 shown in FIG. 7 and FIG. 8, positioning the brake caliper 51 substantially in the same horizontal plane as the shaft 3 (on the X-axis of FIG. 10), may provide for easier access to the brake caliper 51, e.g. when replacing brake pads 58, or when accessing any greasing nipples (not shown).

Figure 11:
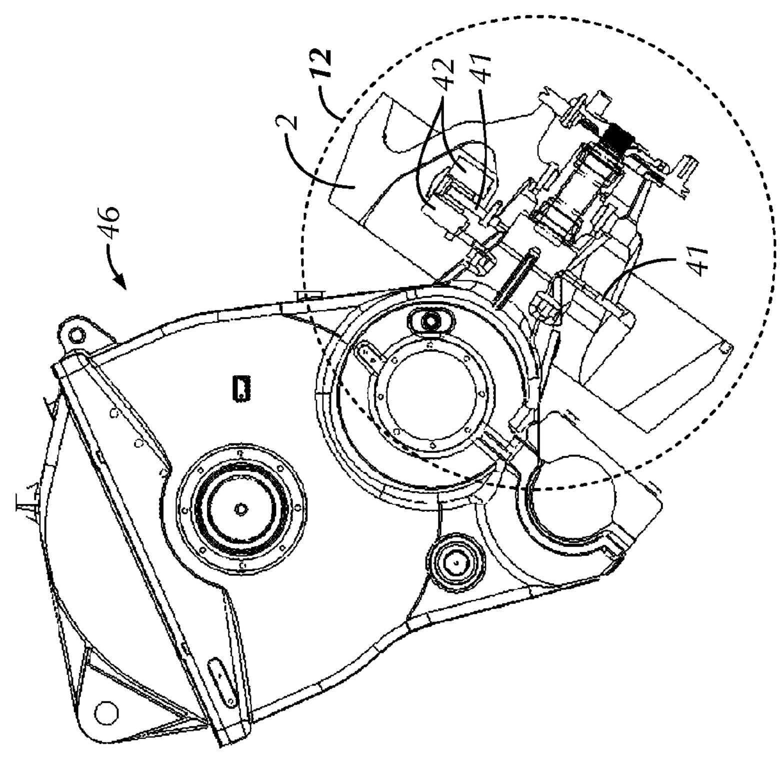
FIG. 11 is a sectional side view of the gearbox assembly of FIG. 7 and FIG. 8.

FIG. 11 shows an embodiment of a gearbox assembly according to the present invention, comprising the gearbox 46 and a flywheel 2 connected to an input shaft 3 of the gearbox 46, and a disc brake 40, from the side and in partially sectional view (as indicated by viewing angle S in FIG. 8). The brake disc 41 is colored in black for illustrative purposes.

Figure 12:
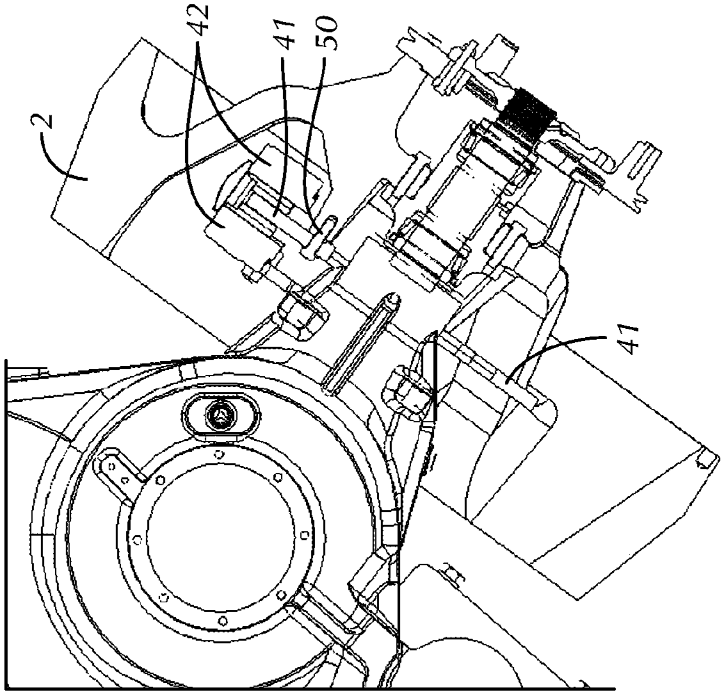
FIG. 12 is an enlarged view of the encircled portion of the gearbox assembly of FIG. 11.

FIG. 12 gives an enlarged view of the encircled part of the gearbox assembly of FIG. 11. The brake disc 41 is connected to the flywheel 2 by fastening means 50.

The invention claimed is:

1. An agricultural baler comprising:
a bale chamber;
a shaft for coupling with a power take-off;
a flywheel connected to the shaft; and
a brake system comprising a disc brake system adapted for braking the flywheel;
wherein the disc brake system comprises a brake disc spaced from the flywheel;
wherein a centre of mass of the brake disc substantially coincides with a centre of mass of the flywheel.

2. The agricultural baler according to claim 1,
wherein the disc brake system is a caliper-type disc brake system, further comprising a brake caliper.

3. The agricultural baler according to claim 2, wherein the brake disc is operatively connected to the flywheel.

4. The agricultural baler according to claim 2, further comprising a gearbox, and wherein the brake caliper is mounted to the gearbox.

5. The agricultural baler according to claim 2, wherein the disc brake system further comprises two brake calipers.

6. The agricultural baler according to claim 2, wherein the disc brake system further comprises three brake calipers.

7. The agricultural baler according to claim 1, further comprising a handle connected to the brake system via a cable.

8. The agricultural baler according to claim 1, wherein the brake system further comprises a hydraulic system, and wherein the baler further comprises a hydraulic circuit fluidly connected to the hydraulic system, and further comprising a brake controller for activating and deactivating the hydraulic system.

9. The agricultural baler according to claim 8, further comprising an emergency stop input device connected to the brake controller, and wherein the brake controller is adapted for activating the brake system with at least a predetermined braking force.

10. The agricultural baler according to claim 8, further comprising a sensor connected to the brake controller and adapted for detecting if a door of the baler is opened, and for sending a signal to the brake controller for stopping the flywheel when the door is opened.

11. The agricultural baler according to claim 8, further comprising:
at least three input devices connected to the brake controller;
wherein a first input device comprises a sensor adapted for detecting if a door of the baler is opened, and for sending a signal to the brake controller for stopping the flywheel when the door is opened;
wherein a second input device comprises a manual or electrical element operably connected to the brake controller adapted for sending a signal for stopping the flywheel;
wherein a third input device comprises an emergency stop input device adapted for sending a signal to the brake controller for stopping the flywheel.

12. The agricultural baler according to claim 1, further comprising a tractor, the tractor comprising the power take-off connectable to the shaft of the baler for accelerating the flywheel of the baler; and a tractor controller circuit for sending a command to a brake controller for activating the brake system.

13. The agricultural baler according to claim 1, wherein the flywheel comprises a conical outer surface.

14. The agricultural baler according to claim 13, wherein the flywheel further comprises a supporting rib;
wherein the supporting rib connects the conical outer surface to the shaft.

15. The agricultural baler according to claim 13, wherein the flywheel further comprises a plurality of supporting ribs;
wherein the plurality of supporting ribs connect the conical outer surface to the shaft.

16. The agricultural baler according to claim 13, wherein the flywheel further comprises at least three supporting ribs;
wherein the at least three supporting ribs connect the conical outer surface to the shaft.

17. A baler flywheel assembly comprising:
a baler flywheel;
a brake system mounted on the baler flywheel, the brake system comprising a disc brake system;
wherein the disc brake system comprises a brake disc spaced from the flywheel;
wherein a centre of mass of the brake disc substantially coincides in a vertical plane with a centre of mass of the flywheel.

18. The baler flywheel assembly according to claim 17, further comprising a baler gearbox;
wherein the baler gearbox is mounted to the flywheel assembly;
and
wherein the disc brake system is a caliper-type disc brake system comprising
a brake caliper, the brake caliper being mounted to the baler gearbox for engaging with the brake disc of the baler flywheel assembly.

19. The baler flywheel assembly according to claim 17, wherein the flywheel comprises a conical outer surface.

* * * * *